United States Patent
Domgörgen et al.

(10) Patent No.: US 9,387,777 B2
(45) Date of Patent: Jul. 12, 2016

(54) SEAT UNDERFRAME FOR MOTOR VEHICLE SEATS

(75) Inventors: Mark Domgörgen, Solingen (DE); Markus Gumbrich, Solingen (DE); Nils Magnus, Remscheid (DE)

(73) Assignee: C. ROB. HAMMERSTEIN GMBH & CO. KG, Solingen (DE)

( * ) Notice: Subject to any disclaimer, the term of this patent is extended or adjusted under 35 U.S.C. 154(b) by 80 days.

(21) Appl. No.: 13/882,119

(22) PCT Filed: Oct. 7, 2011

(86) PCT No.: PCT/EP2011/067559
§ 371 (c)(1),
(2), (4) Date: Jul. 12, 2013

(87) PCT Pub. No.: WO2012/055691
PCT Pub. Date: May 3, 2012

(65) Prior Publication Data
US 2013/0284874 A1     Oct. 31, 2013

(30) Foreign Application Priority Data
Oct. 27, 2010   (DE) .......................... 10 2010 043 012

(51) Int. Cl.
*F16M 11/38* (2006.01)
*B60N 2/06* (2006.01)
(Continued)

(52) U.S. Cl.
CPC  *B60N 2/06* (2013.01); *B60N 2/045* (2013.01); *B60N 2/161* (2013.01); *B60N 2/164* (2013.01); *B60N 2/1615* (2013.01); *B60N 2/1665* (2013.01)

(58) Field of Classification Search
CPC .......... B60N 2/06; B60N 2/161; B60N 2/045; B60N 2/1615; B60N 2/1665; B60N 2/164

USPC ......... 248/157, 415, 419, 420, 421, 424, 167, 248/171, 188.1, 562, 566, 654, 662, 138; 296/65.05, 65.06, 65.13; 297/344.17, 297/330, 284.7, 312, 311, 313, 337, 344.15
See application file for complete search history.

(56) References Cited

U.S. PATENT DOCUMENTS 2,345,182 A * 3/1944 Corber ................... B60N 2/045
                                                              248/419
2,983,307 A * 5/1961 Meyer .................. B60N 2/0232
                                                              248/419

(Continued)

FOREIGN PATENT DOCUMENTS

CN    1636790 A    7/2005
CN    101234611 A  8/2008
(Continued)

OTHER PUBLICATIONS

International Search Report received in connection with international application No. PCT/EP2011/067559; dtd Dec. 29, 2011.
(Continued)

*Primary Examiner* — Jonathan Liu
*Assistant Examiner* — Muhammad Ijaz
(74) *Attorney, Agent, or Firm* — Foley & Lardner LLP

(57) ABSTRACT

A seat underframe for motor vehicle seats, with two pairs of rails arranged at a distance from each other and each having a seat rail and a floor rail, a seat carrier, in each case two pivoting arms which are connected at one end in an articulated manner to the seat carrier and at the other end in an articulated manner to the seat rails and fix the maximum distance between the seat carrier and the seat rails, and a drive unit adjusting the seat carrier between a lower starting position and an end position. The drive unit for adjusting the seat carrier is formed beyond a height end position which is fixed during normal operation.

4 Claims, 3 Drawing Sheets

Figure 1:
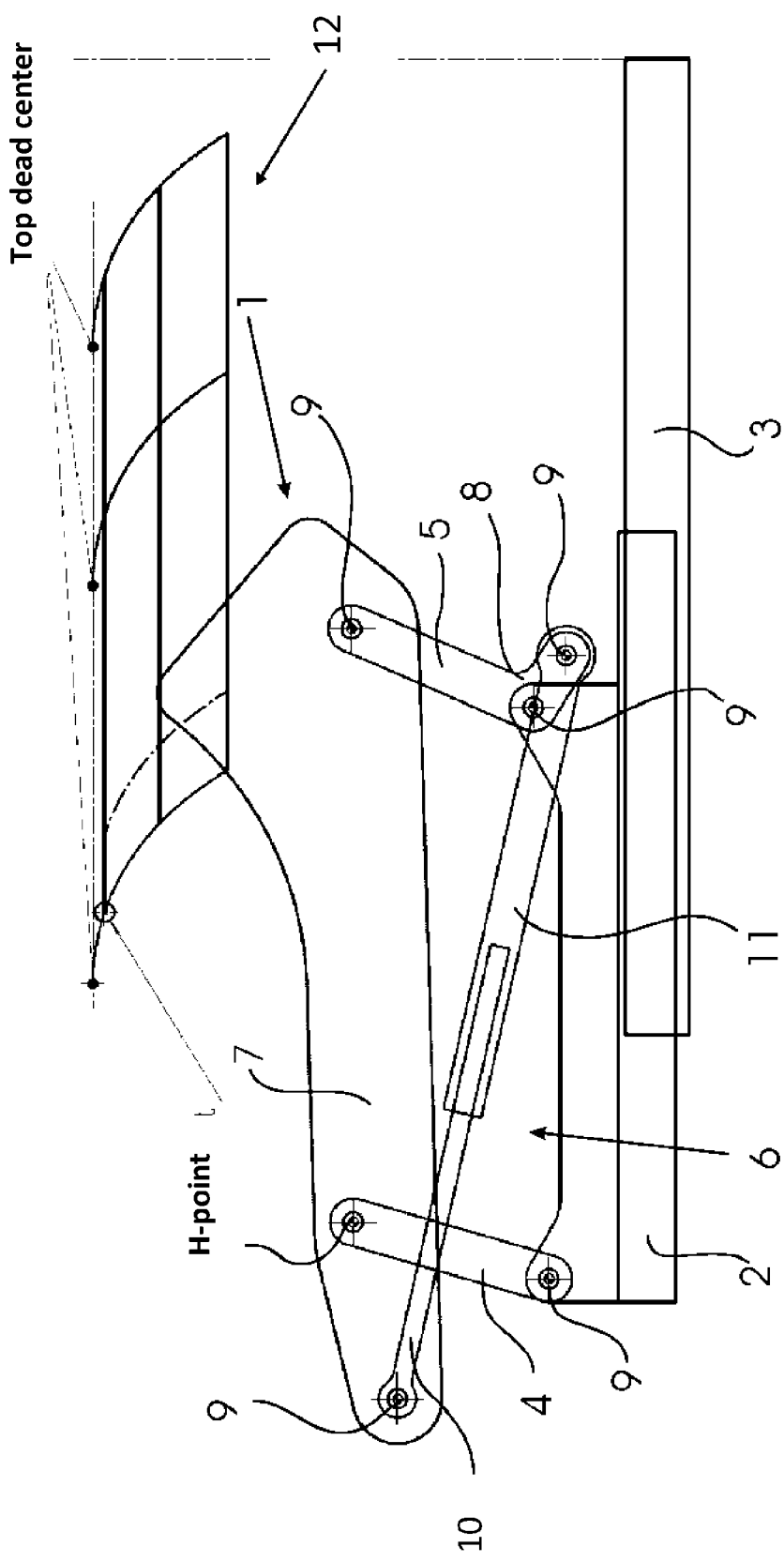

(51) Int. Cl.
  *B60N 2/04*  (2006.01)
  *B60N 2/16*  (2006.01)
  *F16M 13/00*  (2006.01)
  *A47C 1/00*  (2006.01)

(56) References Cited

U.S. PATENT DOCUMENTS

| | | | | |
|---|---|---|---|---|
| 3,006,594 | A * | 10/1961 | Gruendler | B60N 2/045 248/396 |
| 3,339,906 | A * | 9/1967 | Persson | B60N 2/045 248/562 |
| 3,601,351 | A * | 8/1971 | Ambrosius | B60N 2/504 248/566 |
| 3,603,638 | A * | 9/1971 | McGregor | B60N 2/4221 248/429 |
| 3,711,153 | A * | 1/1973 | Cunningham | B60N 2/045 248/419 |
| 3,758,158 | A * | 9/1973 | Radke | B60R 22/26 248/584 |
| 4,350,317 | A * | 9/1982 | Aondetto | B60N 2/502 248/430 |
| 5,022,707 | A * | 6/1991 | Beauvais | B60N 2/4214 248/371 |
| 5,520,439 | A * | 5/1996 | Blount | A47C 1/0345 297/330 |
| 5,580,027 | A * | 12/1996 | Brodersen | B60N 2/502 248/162.1 |
| 5,593,209 | A * | 1/1997 | Bauer | B60N 2/0825 297/344.13 |
| 5,622,406 | A * | 4/1997 | Meschkat | B60N 2/0284 248/395 |
| 5,657,950 | A * | 8/1997 | Han | B64D 11/06 244/122 R |
| 5,782,533 | A * | 7/1998 | Fischer | B60N 2/06 248/421 |
| 5,882,061 | A * | 3/1999 | Guillouet | B60N 2/1615 248/421 |
| 5,979,985 | A * | 11/1999 | Bauer | B60N 2/1615 297/322 |
| 6,030,042 | A * | 2/2000 | Bauer | B60N 2/045 297/340 |
| 6,290,198 | B1 * | 9/2001 | Kojima | B60N 2/1615 248/396 |
| 6,328,380 | B1 * | 12/2001 | du Rees | A47C 1/0246 248/371 |
| 6,371,431 | B1 | 4/2002 | Schmidt et al. | |
| 6,578,920 | B2 * | 6/2003 | Delmas | B60N 2/0224 297/344.17 |
| 7,025,415 | B1 * | 4/2006 | Wu | A47C 9/002 297/119 |
| 7,066,540 | B2 * | 6/2006 | Minai | B60N 2/165 248/421 |
| 7,568,675 | B2 * | 8/2009 | Catton | B60N 2/502 248/421 |
| 7,775,592 | B2 * | 8/2010 | Becker | B60N 2/0232 297/330 |
| 7,984,950 | B2 * | 7/2011 | Hoshi | B60N 2/1615 297/344.1 |
| 8,172,326 | B2 | 5/2012 | Adragna et al. | |
| 8,177,280 | B2 * | 5/2012 | Yamada | B60N 2/161 296/65.05 |
| 8,585,004 | B1 * | 11/2013 | Roeglin | F16M 11/18 248/421 |
| 8,596,721 | B2 * | 12/2013 | Ozawa | B60N 2/1615 248/421 |
| 8,894,152 | B2 * | 11/2014 | Lorey | B60N 2/502 248/421 |
| 2001/0005003 | A1 * | 6/2001 | Koga | B60N 2/067 248/421 |
| 2002/0060487 | A1 * | 5/2002 | Makosa | B60N 2/1615 297/344.1 |
| 2002/0060488 | A1 * | 5/2002 | Delmas | B60N 2/0224 297/344.16 |
| 2003/0227204 | A1 * | 12/2003 | Akaike | B60N 2/1615 297/330 |
| 2004/0075322 | A1 * | 4/2004 | Jaeger | B60N 2/0224 297/325 |
| 2006/0001306 | A1 * | 1/2006 | Becker | B06N 2/002 297/344.15 |
| 2006/0278805 | A1 * | 12/2006 | Haller | B60N 2/502 248/588 |
| 2008/0122280 | A1 | 5/2008 | Jaranson et al. | |
| 2008/0164740 | A1 * | 7/2008 | Harper | B60N 2/045 297/331 |
| 2008/0179932 | A1 | 7/2008 | Becker et al. | |
| 2009/0152433 | A1 * | 6/2009 | Choi | B60N 2/0232 248/421 |
| 2010/0187396 | A1 | 7/2010 | Gilbert et al. | |
| 2012/0187735 | A1 * | 7/2012 | Foelster | B60N 2/1615 297/344.17 |
| 2015/0130240 | A1 * | 5/2015 | Hozumi | B60N 2/0244 297/340 |
| 2015/0239369 | A1 * | 8/2015 | Hoshi | B60N 2/68 297/362.12 |
| 2015/0375647 | A1 * | 12/2015 | Behrens | B60N 2/06 297/325 |

FOREIGN PATENT DOCUMENTS

| | | |
|---|---|---|
| CN | 201189828 Y | 2/2009 |
| CN | 101786425 A | 7/2010 |
| DE | 196 46 470 A1 | 5/1998 |
| DE | 197 58 237 A1 | 7/1998 |
| DE | 197 40 045 A1 | 3/1999 |
| DE | 199 10 080 B4 | 9/2000 |
| DE | 199 14 163 A1 | 10/2000 |
| DE | 1020060 43 759 A1 | 3/2008 |
| DE | 10 2008 030 608 A1 | 2/2009 |
| DE | 1020090 12 958 A1 | 9/2009 |
| FR | 2810000 A1 | 12/2001 |
| WO | WO 02/18170 A1 | 3/2002 |
| WO | WO-2011/113725 A2 | 9/2011 |

OTHER PUBLICATIONS

International Preliminary Report on Patentability in PCT/EP2011/067559 dated May 10, 2013.

Office Action dated Feb. 28, 2015 in corresponding Chinese Application No. 201180051786.4, 6 pages.

Office Action dated Aug. 14, 2015, received in corresponding European application No. 11 775 927.4, 5 pages.

Office Action dated Oct. 23, 2015, received in corresponding Chinese application No. 201180051786.4, 6 pages.

* cited by examiner

SEAT UNDERFRAME FOR MOTOR VEHICLE SEATS

CROSS REFERENCE TO RELATED APPLICATIONS

The present application is a National Stage of International Application No. PCT/EP2011/067559 filed on Oct. 7, 2011, which claims the benefit of German Patent Application No. 10 2010 043 012.9 filed on Oct. 27, 2010, the entire disclosures of which are incorporated herein by reference.

The invention relates to a seat underframe for motor vehicle seats, having
- two pairs of rails arranged at a distance from each other and each having a seat rail and a floor rail,
- a seat carrier,
- in each case two pivoting arms that are articulated at one end to the seat carrier and at the other end to the seat rails and fix the maximum distance between the seat carrier and the seat rails, and
- a drive unit that adjusts the seat carrier between a lower starting position and an end position.

A wide variety of designs of seat underframes of the above-cited type are known from the prior art. They serve to adjustably arrange the actual motor vehicle seats for accommodating the vehicle passengers in the vehicle relative to the vehicle floor to enable the motor vehicle seat to be optimally adapted to the respective user.

In addition to designing the seat underframe to allow the motor vehicle seat to be longitudinally adjusted, the seat underframes are generally constructed to allow the height of the corresponding motor vehicle seat to be adjusted between a high end position which establishes the highest seat position and a lowest position which determines the lowest seat position so that the motor vehicle seats can be optimally adapted to the personal needs of the respective user.

Both the longitudinal adjustment and the adjustment of the seat height of a driver or front passenger seat significantly influences the legroom of the individuals behind the front passenger or driver in the back of the vehicle which is frequently very limited and therefore only offers restricted comfort. If the front passenger seat is not used, the legroom for the passenger behind the front passenger seat can be increased by adjusting the motor vehicle seat to the frontmost position. The legroom can be further increased by changing the height of the front passenger seat, but this can only be done to a slight degree since the height of known motor vehicle seats is only slightly adjustable.

Against this background, the object of the invention is to provide a seat underframe for motor vehicle seats, in particular for front passenger seats, which enables the motor vehicle seat to be transferred into a position in which the sitting comfort resulting from the legroom behind the motor vehicle seat can be increased in a supplementary manner.

The invention achieves this object with a seat underframe having the characteristics of claim 1. Advantageous developments of the invention are provided in the dependent claims.

The seat underframe according to the invention enables the distance from the seat carrier to the seat rail to be adjusted in order to establish the seat height. The seat carrier that forms the seat surface of the motor vehicle seat together with upholstery is either indirectly connected to the seat rail with intermediate, additional seat components, or directly, for example on both sides to side parts of the seat carrier by two articulated pivoting arms in each case. The distance from the seat carrier to the seat rail is hence established by the pivoting movement of the front and rear pivoting arm at their points of articulation to the seat rail. The maximum distance is therefore also established by the pivoting arms, wherein the maximum distance between the seat rail and seat carrier corresponds to the top dead center of the seat carrier relative to the seat rails.

A drive unit is used to set, and generally fix, the seat height which allows the seat carrier to shift relative to the seat rails on the curved path dictated by the pivoting arms. The design of the drive unit for the seat underframe according to the invention is characterized in that it allows the seat carrier to be adjusted beyond the high end position established in normal operation. In normal operation, the adjustment of the height ends at the high end position which is normally established by the end position of the drive unit. The drive unit of the seat underframe according to the invention contrastingly allows displacement beyond the high end position in an operating mode different from normal mode to enhance the comfort of the front passenger by means of increased legroom. The setting of the operating modes, or rather a change between these modes, can be achieved in any desired manner, for example by means of suitable control electronics or adjustable mechanical components.

According to a development of the invention, the drive unit is designed to enable the seat carrier to be moved to the position having the maximum distance. Such an embodiment of the articulated connection of the seat carrier to the seat rail and the drive unit in deviation from known seat underframes allows the seat underframe to be adjusted relative to known seat carriers within a greater range, that is, at least up to the top dead centers of the seat carrier relative to the seat rail which has not been achievable with known systems.

This embodiment according to the invention makes it possible to supplement the legroom in the area behind a motor vehicle seat with a seat underframe according to the invention in comparison to known motor vehicle seats. This significantly increases the comfort of the person sitting in this area relative to known motor vehicle seats without impairing the basic usefulness of a motor vehicle seat manufactured using the seat underframe according to the invention. The seat underframe according to the invention represents a particularly simple and economical solution for increasing the comfort of passengers sitting behind a corresponding motor vehicle seat. The seat underframe according to the invention is particularly recommendable for a front passenger seat of a vehicle used as a limousine to increase the comfort of the person to be driven.

The end position can in principle be freely fixed by the drive unit determining the seat height. According to a development of the invention, the drive unit is designed so that the position of the seat carrier fixed by the drive unit corresponds to the maximum distance between the seat carrier and the seat rails. According to this embodiment of the invention, the drive unit is designed so that it moves the seat carrier proceeding from the bottom initial position to an end position which corresponds with the maximum distance of the seat carrier to the seat rails, that is, the top dead center position of the seat carrier. This embodiment of the invention is characterized in that it generally makes it possible to use an economically manufacturable drive unit.

According to an alternative embodiment of the invention, the drive unit is designed to move the seat carrier into an end position that is arranged proceeding from the bottom initial position of the seat carrier after the maximum distance has been exceeded. According to this embodiment of the invention, the drive unit enables the seat carrier to be adjusted beyond the top dead center into a position lying behind it proceeding from the initial position. A corresponding option for adjusting the seat carrier makes it possible to increase legroom in the area behind a motor vehicle seat in a supplementary manner with a seat underframe developed in this way. For reasons of safety, the drive unit can be provided with sensors that prevent the motor vehicle seat with a seat underframe according to the invention from being moved to the top dead center or beyond when the motor vehicle seat is occupied.

The drive unit can be designed in any manner providing that actuation moves the seat carrier along the curved path established by the pivoting arms. According to a particularly advantageous embodiment of the invention, the drive unit is however designed to change in length with one end being articulated to the seat rail, and the other end articulated to the seat carrier. With the corresponding embodiment of the drive unit, the seat height is adjusted by a manual or automated reduction or increase in the length of the drive unit which causes the seat carrier to shift relative to the seat rail. Articulating the drive unit to the seat rail as well as the seat carrier thereby ensures that the seat carrier moves relative to the seat rail when the drive unit is actuated. The use of a drive unit that can change in length is characterized in that it is particularly easy and economical to manufacture and furthermore allows the seat height to be very precisely established and secured.

As already noted above, the specific embodiment of the drive unit can be designed in any manner. An advantageous drive unit that can change in length can for example be formed by a hydraulic and/or pneumatic unit which can change in length. According to one particularly advantageous embodiment of the invention, the drive unit is, however, formed by a spindle drive. The spindle drive which can be used in conjunction with a drive unit that can change in length as well as, for example, drive a gear unit, and which movably connects the seat carrier to the seat rail, is characterized in that it operates very quietly, can transmit force very effectively, and the manufacturing costs are low. In addition, a spindle drive can be designed particularly small so that the seat underframe only requires a small installation space.

If a drive unit with a changeable length is used, one end is articulated to the seat carrier and the other end is articulated to the rear pivoting arm, in particular with a cantilever arm on the rear pivoting arm in a particularly advantageous embodiment of the invention. In a corresponding embodiment, the installation space can be further reduced since the bearing means used for the articulated arrangement of the rear pivoting arm can be used to arrange the drive unit. An advantageous arrangement on a cantilever arm of the pivoting arm allows the drive unit to be adapted in a particularly advantageous manner to the curved path of the seat carrier defined by the pivoting arms relative to the seat rail, and keeps the seat height adjustment from malfunctioning in a particularly effective manner.

Figure 2:
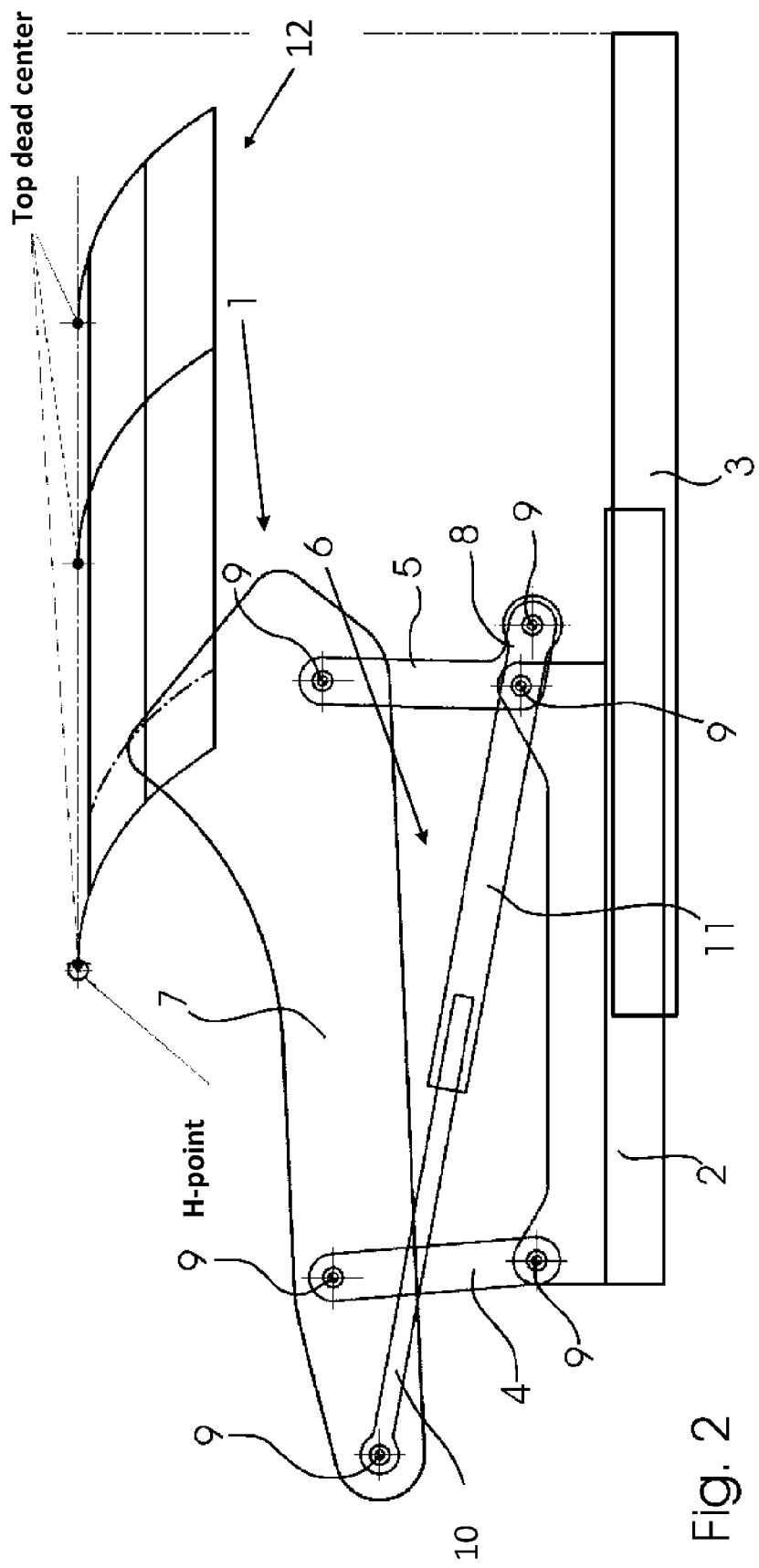
Figure 3:
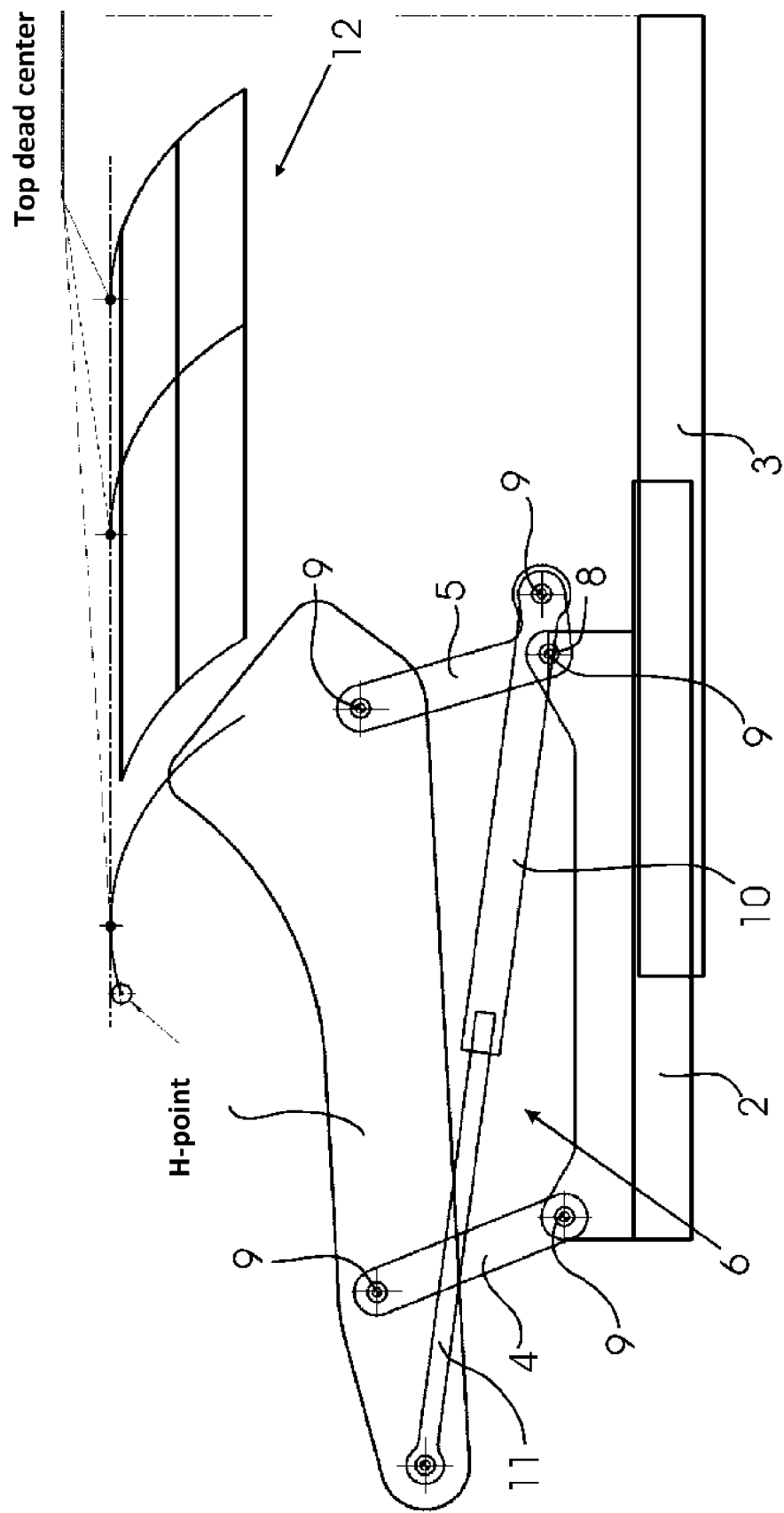

An examplary embodiment of the invention is explained in the following in more detail with reference to the drawings. In the figures FIG. 1 shows a sketch of a side view of a seat underframe in a position arranged between a bottom initial position and a maximum distance;

FIG. 2 shows a sketch of a side view of the seat underframe from FIG. 1 with a seat carrier arranged at a maximum distance from the seat rail, and FIG. 3 shows a sketch of a side view of the seat underframe from FIG. 1 in an end position arranged proceeding from the bottom initial position of the seat carrier after exceeding the maximum distance.

FIGS. 1 to 3 portrays a sketch of a side view of a seat underframe 1 with an adjustment field 12 in each case that indicates the range of movement of the seat carrier 7 resulting from the given options for adjusting the seat carrier 7 in the direction of the length and height relative to the floor rails 3. The H-point indicates the position in the figures that the seat carrier 7 assumes in the position depicted in the field of adjustment 12, wherein the seat carrier 7 is in the front position in all depicted positions such that the H-point runs along the front edge of the field of adjustment 12.

The seat carrier 7 serves to accommodate upholstery (not shown) and is articulated on both sides by means of a front pivoting arm 4 and a rear pivoting arm 5 to a pair of rails comprising the seat rail 2 and the floor rail 3. The front pivoting arms 4 and the rear pivoting arms 5 serve to articulate the seat rails 2 to the seat carrier 7, and they are mounted at one end by means of pivot bolts arranged in the seat carrier 7 and at the other end by means of pivot bolts 9 arranged in the seat rail 2. The pivoting arms 4, 5 can be arranged on the seat carrier 7 at any location, for example on correspondingly designed side parts or other suitable components of the seat carrier 7.

Articulating the seat carrier 7 to the seat rail 2 allows the seat height to be adjusted, wherein the seat carrier 7 can be swiveled along a path dictated by the pivoting arms 4, 5. A drive unit 6 serves to adjust the seat carrier 7 relative to the seat rail 2, and it is articulated at one end to the seat carrier 7 and at the other end to a cantilever arm 8 of a rear pivoting arm 5 by means of a pivot bolt 9. Changing the length of the drive unit 9 by adjusting a spindle 10 of the drive unit 6 relative to a spindle nut 11 (schematically portrayed) allows the seat carrier 7 to be shifted in height from an intermediate position shown in FIG. 1 into the position shown in FIG. 2 in which the seat carrier 7 is at a maximum distance relative to the seat rail 2 as can be seen from the position of the H-point in the field of adjustment 12. The maximum distance corresponds to the top dead center of the seat carrier 7 relative to the seat rail 2.

To achieve supplementary legroom behind the seat underframe 1, the drive unit 6 is designed such that it allows the seat carrier 7 to be shifted to the end position shown in FIG. 3 in which the seat carrier 7 is arranged proceeding from a bottom end position after exceeding a top dead center of the seat carrier 7 (see the position of the H-point in the field of adjustment 12).

The invention claimed is:

1. A seat underframe for motor vehicle seats, comprising:
   two pairs of seat rails arranged at a distance from each other and each having a seat rail and a floor rail,
   a seat carrier configured to be moved relative to the two pairs of seat rails between a lower starting position and an end position,
   a front pivoting arm and a rear pivoting arm that are each articulated at one end to the seat carrier and at the other end to one of the seat rails and fix the maximum vertical distance that can be achieved between the seat carrier and the seat rails as the seat carrier is moved between the lower starting position and the end position,
   wherein the one end of the rear pivoting arm is articulated to the seat carrier, and the other end of the rear pivoting arm is articulated to one of the seat rails through a seat rail pivot bolt,
   wherein the seat carrier is in a highest position at the maximum vertical distance between the seat carrier and the seat rails, and
   a drive unit that adjusts the seat carrier between the lower starting position and the end position,
   wherein one end of the drive unit is articulated to the seat carrier, and the other end of the drive unit is articulated to a cantilever arm of the rear pivoting arm through a cantilever pivot bolt on the cantilever arm, wherein the seat rail pivot bolt of the rear pivoting arm and the cantilever pivot bolt are arranged such that the cantilever pivot bolt and the other end of the drive unit are vertically movable above and below the seat rail pivot bolt, wherein the drive unit is designed to move the seat carrier along a path of movement from the lower starting position to the highest position and then to the end position, wherein the highest position is positioned between the lower starting position and the end position along the path of movement, wherein the drive unit includes at least one sensor configured to detect whether the motor vehicle seat is occupied to prevent the seat carrier from moving to the highest position and the end position when the motor vehicle seat is occupied, wherein the drive unit is formed by a spindle drive.

2. The seat underframe according to claim 1, wherein the drive unit is designed to move the seat carrier into the highest position at the maximum vertical distance.

3. The seat underframe according to claim 1, wherein the drive unit is designed to move the seat carrier into the end position that is arranged longitudinally beyond the highest position, wherein the highest position is arranged longitudinally beyond the lower starting position of the seat carrier.

4. The seat underframe according to claim 1 wherein the drive unit is designed to change in length, and one end is articulated to the seat rail, and the other end is articulated to the seat carrier.

* * * * *